(12) United States Patent
Yokota et al.

(10) Patent No.: US 8,893,158 B2
(45) Date of Patent: Nov. 18, 2014

(54) INFORMATION PROCESSING APPARATUS THAT SWITCHES BETWEEN PROCESSING UNITS RUNNING OPERATING SYSTEMS TO BE ASSOCIATED WITH A USER INTERFACE AND METHOD FOR CONTROLLING INFORMATION PROCESSING APPARATUS

(75) Inventors: Koichi Yokota, Yokohama (JP); Isamu Yamada, Kawasaki (JP); Shinichi Shiotsu, Kawasaki (JP); Hiroyasu Sugano, Koto (JP); Hideki Tanaka, Kawasaki (JP); Akira Itasaki, Yokohama (JP); Daisuke Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 13/610,111

(22) Filed: Sep. 11, 2012

(65) Prior Publication Data

US 2013/0125126 A1    May 16, 2013

(30) Foreign Application Priority Data

Nov. 15, 2011  (JP) ................. 2011-249900

(51) Int. Cl.
 *G06F 9/48*    (2006.01)
(52) U.S. Cl.
 CPC ........................ *G06F 9/48* (2013.01)
 USPC ............................ 719/319; 718/100; 718/108
(58) Field of Classification Search
 None
 See application file for complete search history.

(56) References Cited

U.S. PATENT DOCUMENTS

| | | | | |
|---|---|---|---|---|
| 7,434,224 | B2* | 10/2008 | Lescouet et al. | 718/108 |
| 7,810,096 | B2* | 10/2010 | Saito et al. | 718/103 |
| 7,877,592 | B2* | 1/2011 | Sun et al. | 713/100 |
| 8,024,742 | B2* | 9/2011 | Lescouet et al. | 718/108 |
| 8,201,170 | B2* | 6/2012 | Lescouet et al. | 718/100 |
| 8,312,476 | B2* | 11/2012 | Chin et al. | 719/319 |
| 8,312,477 | B2* | 11/2012 | Lin | 719/319 |
| 8,612,992 | B2* | 12/2013 | Lescouet et al. | 718/108 |
| 2004/0226020 | A1* | 11/2004 | Birmingham | 719/310 |
| 2010/0211769 | A1* | 8/2010 | Shankar et al. | 713/2 |

FOREIGN PATENT DOCUMENTS

JP    2005-202691    7/2005

* cited by examiner

*Primary Examiner* — Qing Wu
(74) *Attorney, Agent, or Firm* — Staas & Halsey LLP

(57) ABSTRACT

An information processing apparatus includes a user interface, a switching unit, and a computer. The user interface is for a user that operates a first processing unit that runs a first operating system or a second processing unit that runs a second operating system. The switching unit selectively switches between the first processing unit and the second processing unit to be associated with the user interface. The computer functions as the first processing unit. The computer functions as the second processing unit. The computer runs a first application program on the first operating system. The computer activates, on the second operating system, a second application program related to the first application program, in a state in which the first processing unit is associated with the user interface. The computer controls the switching unit upon completion of the activation of the second application program.

8 Claims, 15 Drawing Sheets

| CATEGORY | APPLICATION (112) | APPLICATION (208) |
|---|---|---|
| PHOTOGRAPH VIEWING AND EDITING | IMAGE VIEWER APPLICATION | PHOTOSHOP |
| VIDEO EDITING | BLU-RAY DISC PLAYLIST DISPLAY APPLICATION | WIN DVD |
| OFFICE-RELATED TOOLS | EXCEL VIEWER APPLICATION | MICROSOFT EXCEL |
| | | MICROSOFT WORD |

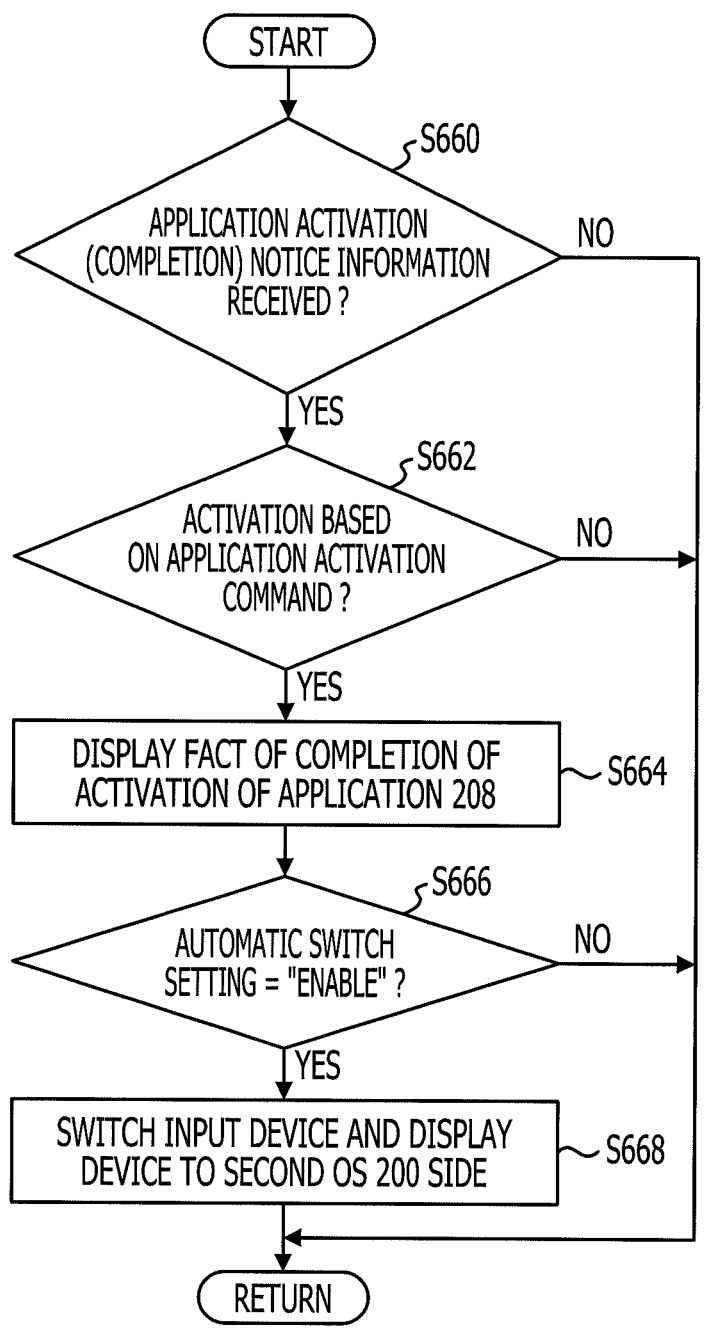

INFORMATION PROCESSING APPARATUS THAT SWITCHES BETWEEN PROCESSING UNITS RUNNING OPERATING SYSTEMS TO BE ASSOCIATED WITH A USER INTERFACE AND METHOD FOR CONTROLLING INFORMATION PROCESSING APPARATUS

CROSS-REFERENCE TO RELATED APPLICATION

This application is based upon and claims the benefit of priority of the prior Japanese Patent Application No. 2011-249900, filed on Nov. 15, 2011, the entire contents of which are incorporated herein by reference.

FIELD

The embodiments discussed herein relate to an information processing apparatus and a method for controlling the information processing apparatus.

BACKGROUND

Conventionally, an information processing apparatus having a plurality of operating systems (OSs) is known. Switching between the OSs allows a user to use application programs dependent upon each OS with one information processing apparatus, thus improving the level of convenience in using the information processing apparatus. Hereinafter, a process carried out by executing an OS program is referred to as an OS process, or simply an OS. A process carried out by executing an application program is referred to as an application process, or simply an application.

FIG. 1 illustrates an example of usage states conducted by a user of a dual OS terminal (information processing apparatus) having two types of OSs. First, at the point in time T01, the user is viewing a video with an application running on a first OS. At the point in time T02, the user decides to edit the video that he/she is viewing. It is assumed that the user feels that, for editing the video, an application running on a second OS is better than an application running on the first OS and so the user decides to switch to the second OS. Therefore, at the point in time T03, the user manually switches between OSs and between display windows to the second OS side. At the point in time T04 after the second OS has been activated, the user searches for an application related to video editing and activates the application. At the point in time T05, the user may edit the video with the activated application.

Related to this type of technique, an information processing apparatus that may exclusively switch operating environments is known. With this type of information processing apparatus for example, the operating environment is switched to allow either the first OS or the second OS to run. For example, when switching between OSs, the user gives an instruction to switch between OSs when activating the information processing apparatus after terminating the OS that was running. When a certain message is stored in a storage device while the first OS is running, the operation of an OS (e.g., the second OS) for executing the message is started when the power is turned on and restart is conducted.

Japanese Laid-Open Patent Publication No. 2005-202691 discloses a related technique.

However, in a conventional information processing apparatus, a certain amount of time and effort are involved since the user is expected to manually perform the restart when switching between the OSs and press a button to give the instruction to conduct the switch. More time and effort are involved to search for a desired application on the selected OS and activate the application.

For example, even if the OS to be selected upon activation may be determined automatically, the user is expected to perform certain tasks when switching between OSs and time and effort are involved similarly. Also the problem remains that the user has to wait during switching time for switching between OSs and between applications.

Accordingly, conventional information processing apparatuses are not very convenient when switching between OSs and between applications.

SUMMARY

According to an aspect of the present invention, provided is an information processing apparatus including a user interface, a switching unit, and a computer. The user interface is for a user that operates a first processing unit that runs a first operating system or a second processing unit that runs a second operating system. The switching unit selectively switches between the first processing unit and the second processing unit to be associated with the user interface. The computer functions as the first processing unit. The computer functions as the second processing unit. The computer runs a first application program on the first operating system. The computer activates, on the second operating system, a second application program related to the first application program, in a state in which the first processing unit is associated with the user interface. The computer controls the switching unit upon completion of the activation of the second application program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example of a related-application data table according to a first embodiment;

FIG. 15 is a flow chart describing a flow of a process executed by an automatic switch/completion notice control unit according to a second embodiment.

DESCRIPTION OF EMBODIMENTS

The embodiments will be discussed below with reference to the attached drawings.

First Embodiment

An information processing apparatus according to a first embodiment will be discussed below with reference to the drawings.

Hardware Configuration

Figure 1:
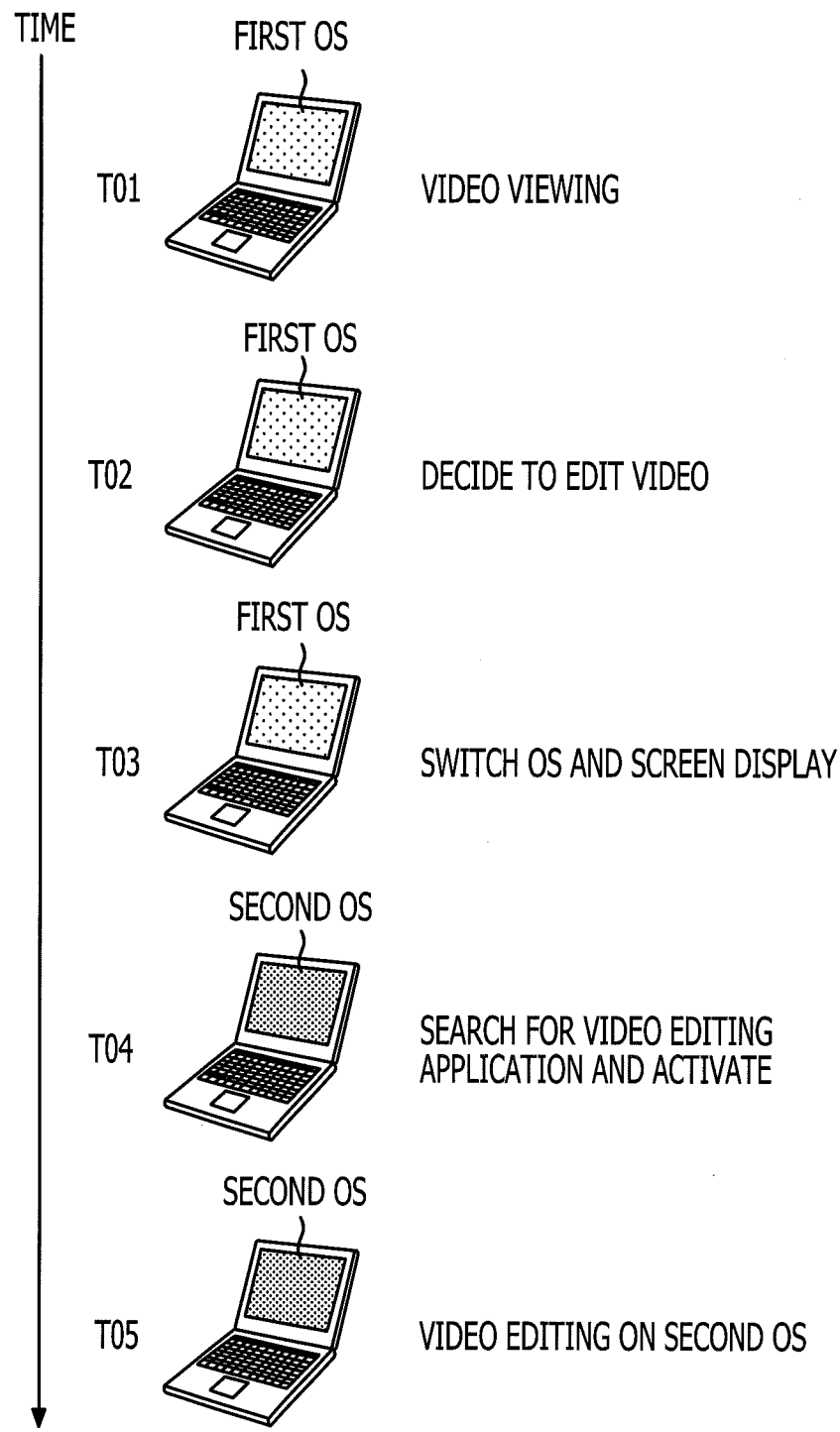
FIG. 1 illustrates an example of usage states conducted by a user of a dual OS terminal (information processing apparatus) having two types of OSs.
Figure 2:
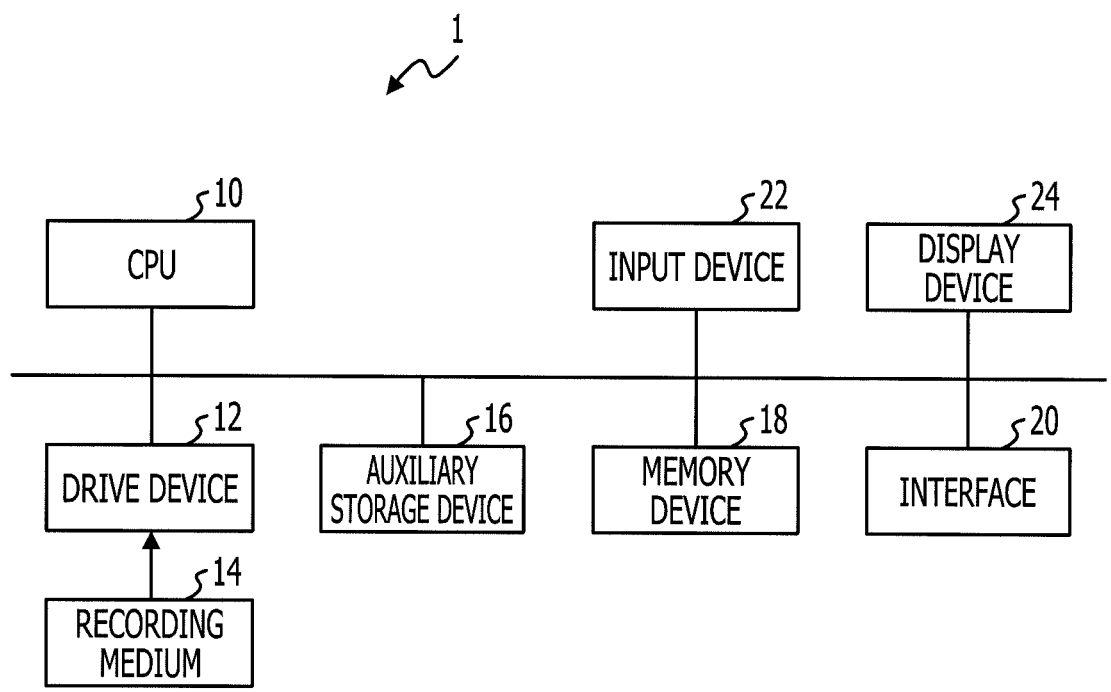
FIG. 2 is an example of a hardware configuration of an information processing apparatus according to an embodiment.

FIG. 2 is an example of a hardware configuration of an information processing apparatus 1 according to a first embodiment. The information processing apparatus 1 includes, for example, a central processing unit (CPU) 10, a drive device 12, an auxiliary storage device 16, a memory device 18, an interface 20, an input device 22, and a display device 24. The constituent elements are connected via a bus or a serial line and the like.

The CPU 10, for example, is a processor having a program counter and command decoder, various computing elements, a load store unit (LSU), a general purpose register, and the like.

The drive device 12 is a device that is able to read programs and data from a recording medium 14. When the recording medium 14 with programs recorded thereon is loaded onto the drive device 12, the programs are installed in the auxiliary storage device 16 via the drive device 12 from the recording medium 14. The recording medium 14 is, for example, a portable recording medium such as a compact disc (CD), a digital versatile disk (DVD), or a universal serial bus (USB) memory. The auxiliary storage device 16 is, for example, a hard disk drive (HDD) or a flash memory.

Besides using the abovementioned recording medium 14, installation of programs may be conducted by downloading a program from another computer through a network and the interface 20 and then installing the program in the auxiliary storage device 16. The network may be the Internet, a local area network (LAN), a wireless network, and the like. Programs may also be stored beforehand in the auxiliary storage device 16, a read-only memory (ROM), and the like when shipping the information processing apparatus 1.

By allowing the CPU 10 to execute programs installed or stored beforehand in this way, an information processing apparatus illustrated in FIG. 2 is able to function as the information processing apparatus 1 according to the present embodiment.

The memory device 18 is, for example, a random access memory (RAM), an electrically erasable and programmable read-only memory (EEPROM), and the like. The interface 20 controls connections and the like with the abovementioned network.

The input device 22 may be, for example, a keyboard, a mouse, a button, a touch pad, a touch panel, or a microphone. The display device 24 may be a display device such as a liquid crystal display (LCD) or a cathode ray tube (CRT). The information processing apparatus 1 may also include other types of output devices such as a printer or a speaker in addition to the display device 24.

Functional Configuration

Figure 3:
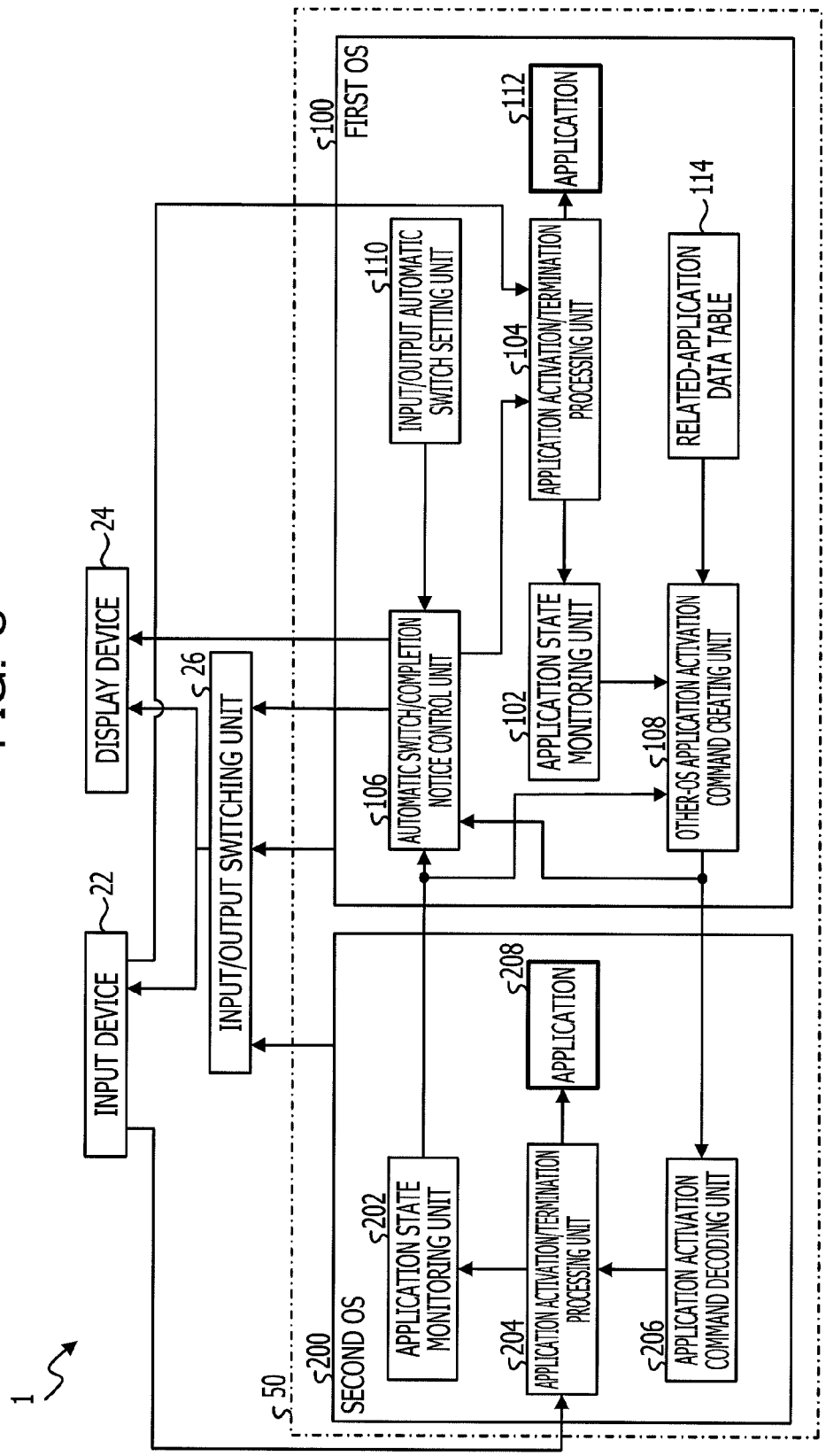
FIG. 3 is an example of a functional configuration of an information processing apparatus according to a first embodiment.

FIG. 3 is an example of a functional configuration of the information processing apparatus 1 according to the first embodiment. The information processing apparatus 1 may run a first OS 100 and a second OS 200 on a same platform 50. At least portions of, for example, the CPU 10, the drive device 12, the auxiliary storage device 16, the memory device 18, and the interface 20 are included in the platform 50.

An input/output switching unit 26 is connected to the input device 22 and the display device 24. The input/output switching unit 26 outputs input/output switching signals to the input device 22 and the display device 24 according to instructions from the OSs to associate the input device 22 and the display device 24 with either one of the OSs. For example, the input/output switching unit 26 switches between a combination of a display screen of the first OS 100 and display data created by the first OS 100 and a combination of a display screen of the second OS 200 and display data created by the second OS 200, and selectively causes either combination of the display screen and the display data to be displayed on the display device 24. The input/output switching unit 26 may conduct switching so that contents inputted through the input device 22 are reflected in either one of the first OS 100 or the second OS 200.

The input/output switching unit 26 may, for example, make the display screen displayed by one of the OSs a main portion and make the display screen displayed by the other OS a subordinate portion instead of selectively switching between full display screens.

The first OS 100 and the second OS 200 of the present embodiment fundamentally operate by the selection of one or the other, but are also able to operate concurrently through time sharing and the like. The display device 24 selectively displays a display screen displayed by one of the OSs even during a period in which the first OS 100 and the second OS 200 operate concurrently.

An application state monitoring unit 102, an application activation/termination processing unit 104, an automatic switch/completion notice control unit 106, an other-OS application activation command creating unit 108, an input/output automatic switch setting unit 110, an application 112, and the like run on the first OS 100. The other-OS application activation command creating unit 108 may refer to a related-application data table 114 stored in the auxiliary storage device 16, the memory device 18, and the like. The first OS 100 is, for example, an Android (trademark) OS.

An application state monitoring unit 202, an application activation/termination processing unit 204, an application activation command decoding unit 206, an application 208, and the like run on the second OS 200. The second OS 200 is, for example, a Windows (trademark) OS.

The functional blocks to be run on the OSs may function when the CPU 10 execute program software stored in the auxiliary storage device 16, on a ROM, and the like. The functional blocks are not necessarily implemented by executing clearly separated programs, but may also be called up as subroutines or functions by a process performed by executing another program. A portion of the functional blocks may be hardware such as an integrated circuit (IC) or a field programmable gate array (FPGA).

The application 112 and the application 208 may be, for example, Internet browsers, mailers, video playback applications, video editing applications, still picture viewing applications, still picture editing applications, text editing applications, spreadsheet applications, notepad applications, and the like, and may run on either of the OSs. In the present embodiment, a group of applications running on either one of the OSs will be referred to respectively as the application 112 or the application 208.

Herein, the expected power consumption of the second OS 200 is assumed to be larger than that of the first OS 100. The expected power consumption of a system built as the core of an OS may be determined from the CPU operating frequency, the average CPU utilization rate and processing time of the software per unit of time, the supply voltage, the average memory utilization amount per unit of time, and the like. The expected power consumption of a system built as the core of an OS may be determined from electrical power consumed when running the same process. In the present embodiment, since Android is used as the first OS 100 and Windows is used as the second OS 200, it may be assumed that the power consumption of the second OS 200 is larger than that of the first OS 100. It is because in Android, compared to in Windows, simple processes are run more, the average CPU utilization rate and processing time of software per unit of time is smaller, the average memory utilization amount per unit of time is smaller, and the electrical power consumed when running the same process is smaller.

The application state monitoring unit 102 monitors the state of the application 112, and outputs application activation/termination information that indicates the activation or termination of the application 112 to the other-OS application activation command creating unit 108 when the application 112 is activated or terminated. The application state monitoring unit 102 recognizes the state of the application 112 by referring to the application activation/termination information received from the application activation/termination processing unit 104.

The application activation/termination processing unit 104 performs activation processing or termination processing of the application 112 in accordance with a user operation performed on the input device 22.

The automatic switch/completion notice control unit 106 receives application activation/termination notice information from the application state monitoring unit 202 and receives an application activation command from the other-OS application activation command creating unit 108. The automatic switch/completion notice control unit 106 causes the display device 24 to display activation completion notice information regarding the application 208, and transmits input/output switching information to the input/output switching unit 26 as described later. The automatic switch/completion notice control unit 106 switches between these control operations according to automatic switch setting information received from the input/output automatic switch setting unit 110. Details of these control operations will be discussed later.

The other-OS application activation command creating unit 108 searches the related-application data table 114 for the application 208 related to the activated application 112 by using the application activation/termination information received from the application state monitoring unit 102. The other-OS application activation command creating unit 108 refers to the application activation/termination notice information received from the application state monitoring unit 202 to confirm whether or not the application 208 related to the activated application 112, that is the application 112 associated with the input device 22 and the display device 24, has been activated. When the application 208 related to the activated application 112 has not been activated, the other-OS application activation command creating unit 108 creates an other-OS application activation command and outputs the created other-OS application activation command to the application activation command decoding unit 206 and the automatic switch/completion notice control unit 106.

The related-application data table 114 is a data table in which an application included in the application 112 is associated with an application included in the application 208, which is considered to be related in use by the user. FIG. 4 is an example of the related-application data table 114.

As illustrated in FIG. 4, an image viewer application, for example, is associated with Photoshop (trademark) in the related-application data table 114. Photoshop is related to the image viewer application since the user who is using the image viewer application will likely want to use Photoshop for detailed editing.

In the related-application data table 114, a Blu-ray (trademark) disc playlist display application, for example, is associated with Win DVD (trademark). Win DVD is related to the Blu-Ray disc playlist display application since the user will likely want to use Win DVD because the Blu-Ray disc playlist display application does not allow playback of a Blu-Ray disc.

In the related-application data table 114, an Excel viewer application, for example, is associated with Microsoft Excel (trademark) and Microsoft Word (trademark). Microsoft Excel is related to the Excel viewer application since the user will likely want to use Microsoft Excel because the Excel viewer application does not support Visual Basic for Applications (VBA). Microsoft Word is also related to the Excel viewer application since the user may want to use the data calculated with Microsoft Excel in a document.

In the related-application data table 114, one application included in the application 112 is not necessarily associated one-to-one with one application included in the application 208. One application 112 may be associated with a plurality of applications 208. A plurality of applications 112 may be associated with one application 208 or a plurality of applications 208.

The input/output automatic switch setting unit 110 detects a user operation performed on the input device 22. The input/output automatic switch setting unit 110 saves the automatic switch setting information that is determined according to the user operation and that is used for instructing a control mode of the automatic switch/completion notice control unit 106. The automatic switch setting information is a flag for determining whether to automatically switch to the second OS 200 side after displaying information indicating that the activation of the application 208 has been completed. The input/output automatic switch setting unit 110 outputs the automatic switch setting information to the automatic switch/completion notice control unit 106.

The application state monitoring unit 202 monitors the state of the application 208 and transmits application activation/termination notice information that indicates the activation or termination of the application 208 to the automatic switch/completion notice control unit 106 when the application 208 is activated or terminated. The application state monitoring unit 202 recognizes the state of the application 208 by referring to the application activation/termination information received from the application activation/termination processing unit 204.

The application activation/termination processing unit 204 performs activation processing or termination processing of the application 208 in accordance with a user operation performed on the input device 22 or in accordance with application activation instruction information received from the application activation command decoding unit 206.

The application activation command decoding unit 206 decodes the application activation command received from the other-OS application activation command creating unit 108 and outputs an application activation instruction to the application activation/termination processing unit 204 in accordance with the results of the decoding.

Processing for Automatically Activating Application on Other OS

Processing (other-OS application automatic activation processing) conducted by the information processing apparatus 1 according to the present embodiment to automatically activate an application on another OS will be discussed below with reference to a sequence diagram and flow charts.

Figure 5:
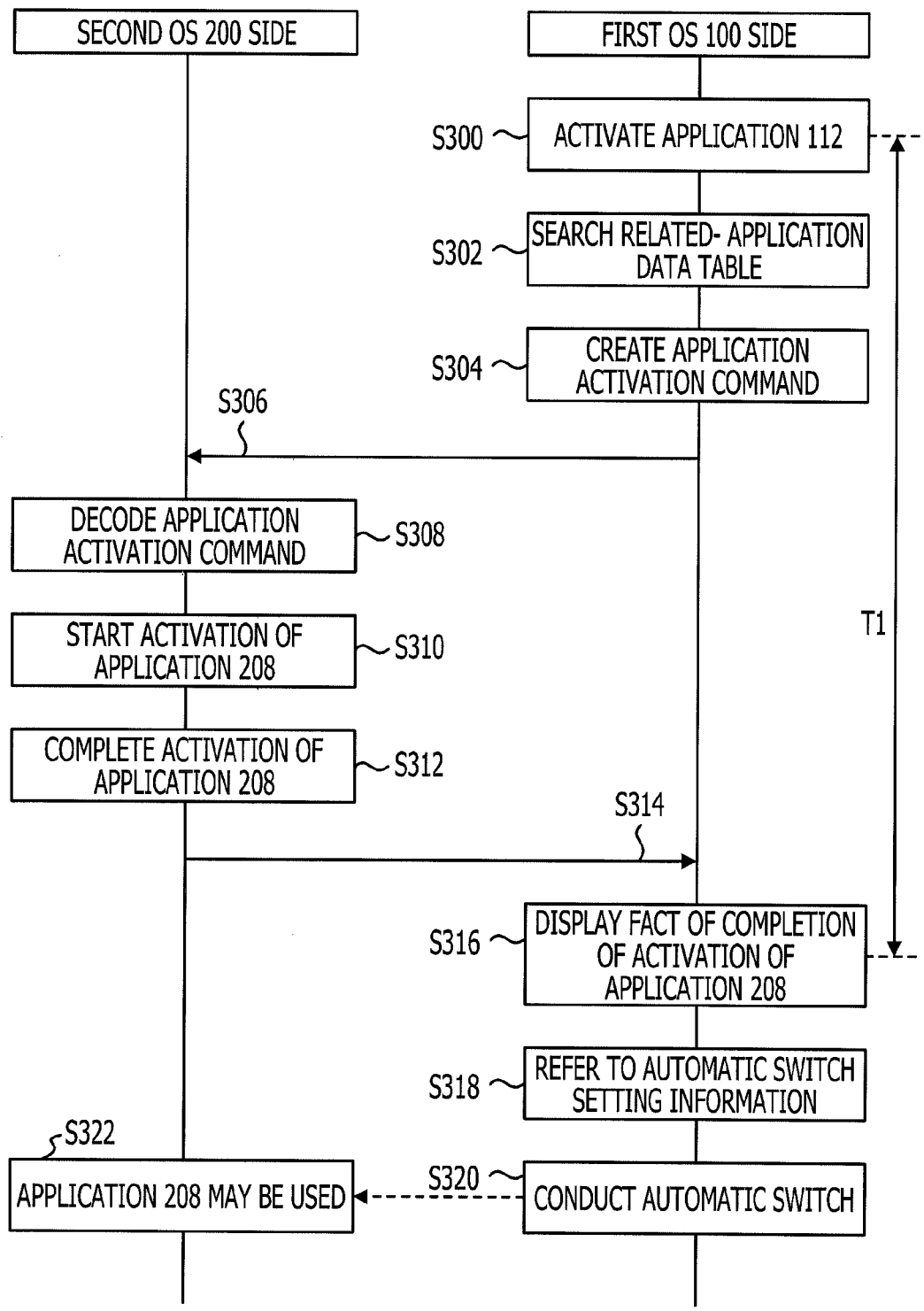
FIG. 5 is a sequence diagram of a flow of a process executed by an information processing apparatus according to a first embodiment.

FIG. 5 is a sequence diagram of a flow of a process executed by the information processing apparatus 1. Determination processing and the like will be discussed in detail with reference to the flow charts and an outline of the processing will be discussed with reference to the sequence diagram.

First, the application 112 is activated on the first OS 100 (S300). When the application 112 is activated, application activation information is inputted from the application state monitoring unit 102 to the other-OS application activation command creating unit 108. The other-OS application activation command creating unit 108 searches the related-application data table 114 upon receiving the application activation information (S302).

The other-OS application activation command creating unit 108 creates an application activation command when the application 208 related to the activated application 112 exists in the related-application data table 114 (S304). The other-OS application activation command creating unit 108 transmits the created application activation command to the second OS 200 (S306). The application activation command is also outputted to the automatic switch/completion notice control unit 106.

The second OS 200 switches, for example, from a sleep state to a normal activated state upon receiving the application activation command. Then, the application activation command decoding unit 206 decodes the application activation command (S308). The application activation command decoding unit 206 outputs the application activation instruction information specifying the application 208 to be activated to the application activation/termination processing unit 204.

The application activation/termination processing unit 204 starts the activation of the specified application 208 upon receiving the application activation instruction information (S310). When the activation of the application 208 is completed (S312), the application state monitoring unit 202 transmits application activation (completion) notice information to the automatic switch/completion notice control unit 106 on the first OS 100 side (S314).

Upon receiving the application activation (completion) notice information, the automatic switch/completion notice control unit 106 instructs the display device 24 to display the fact that the activation of the application 208 is completed when the activation is based on the application activation command (S316).

During a time period T1 from when the application 112 is activated in S300 until the fact that the activation of the application 208 is completed is displayed in S316, the display screen of the first OS 100 is displayed by the display device 24 and the user may continue using the application 112. That is, the automatic activation processing of the application 208 related to the application 112 is conducted in the background as seen from the user's point of view. As a result, the user is not expected to wait until the OS and application switching processing is completed, which is an improvement in convenience for the user.

The automatic switch/completion notice control unit 106 refers to the automatic switch setting information received beforehand from the input/output automatic switch setting unit 110 (S318). When the automatic switch setting information is set as "enable", the automatic switch/completion notice control unit 106 instructs the input/output switching unit 26 to output an input/output switching signal that instructs the input device 22 and the display device 24 to be associated with the second OS 200 side (S320). At this time, the automatic switch/completion notice control unit 106 may instruct the application activation/termination processing unit 104 to conduct termination processing of the application 112.

By the processing in S320, the user may use the application 208 since the display screen displayed by the display device 24 is switched to the display screen of the second OS 200 and the contents inputted to the input device 22 are reflected in the second OS 200 (S322).

Conversely, when the automatic switch setting information is set as "disable", the automatic switch/completion notice control unit 106 does not perform the processing in S320 and terminates the other-OS application automatic activation processing. In this case, the information processing apparatus 1 accepts an OS switching operation conducted by the user on the input device 22. The user may activate the second OS 200 to use the application 208 by performing an OS switching operation on the input device 22.

Thus, the expectation for the user to manually reactivate the OS for switching between OSs or press a button for instructing a switch may be omitted according to the user's desire (automatic switch setting). The time and effort involved to search for a desired application and activate the desired application on the selected OS may also be omitted. Therefore, the information processing apparatus 1 that executes the above processing may improve the convenience for the user.

Figure 6:
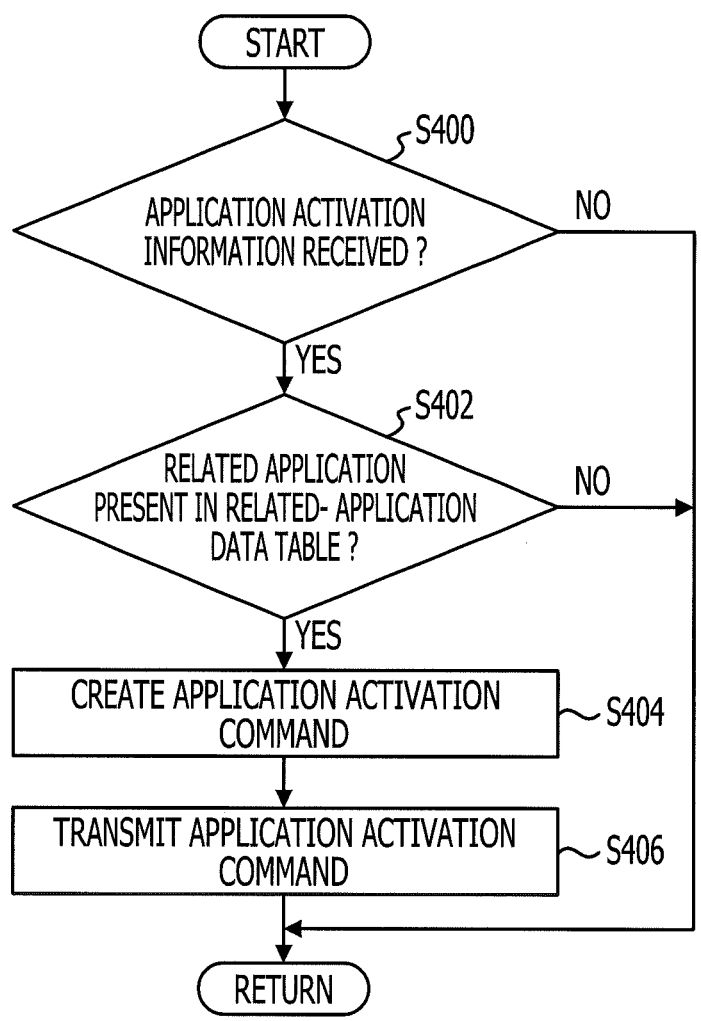
FIG. 6 is a flow chart describing a flow of a process executed by an other-OS application activation command creating unit according to a first embodiment.
Figure 7:
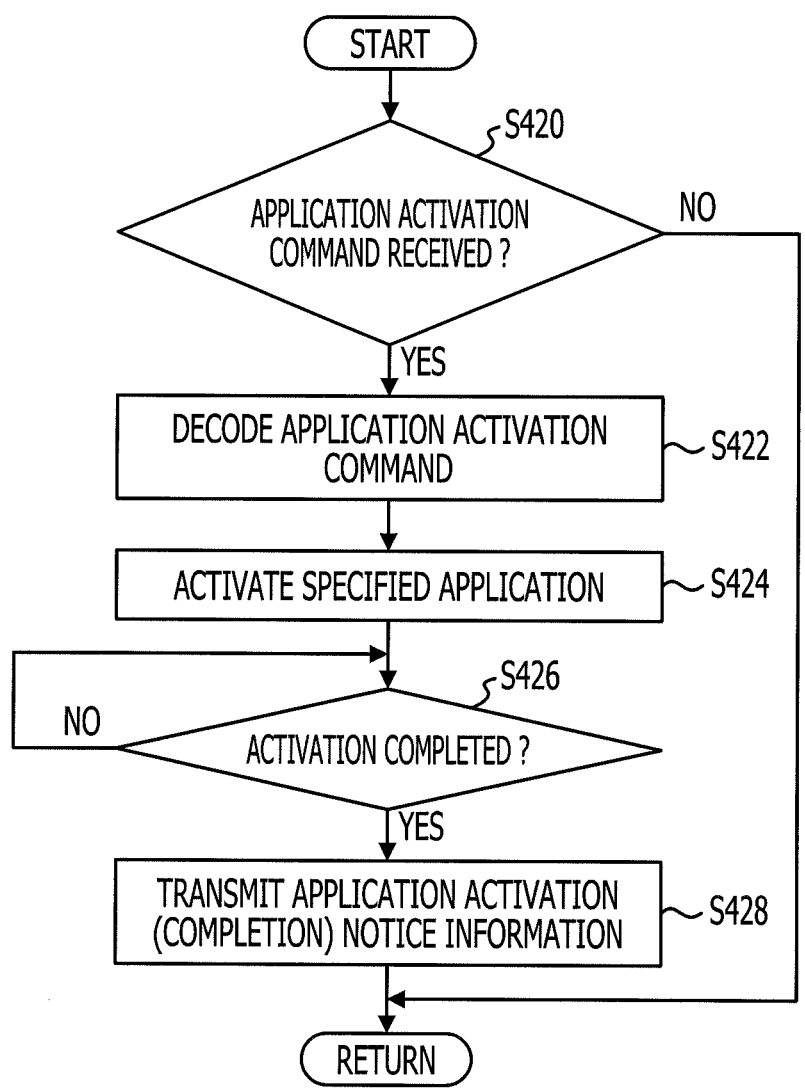
FIG. 7 is a flow chart describing a flow of a process executed by an application state monitoring unit, an application activation/termination processing unit, and an application activation command decoding unit according to a first embodiment.
Figure 8:
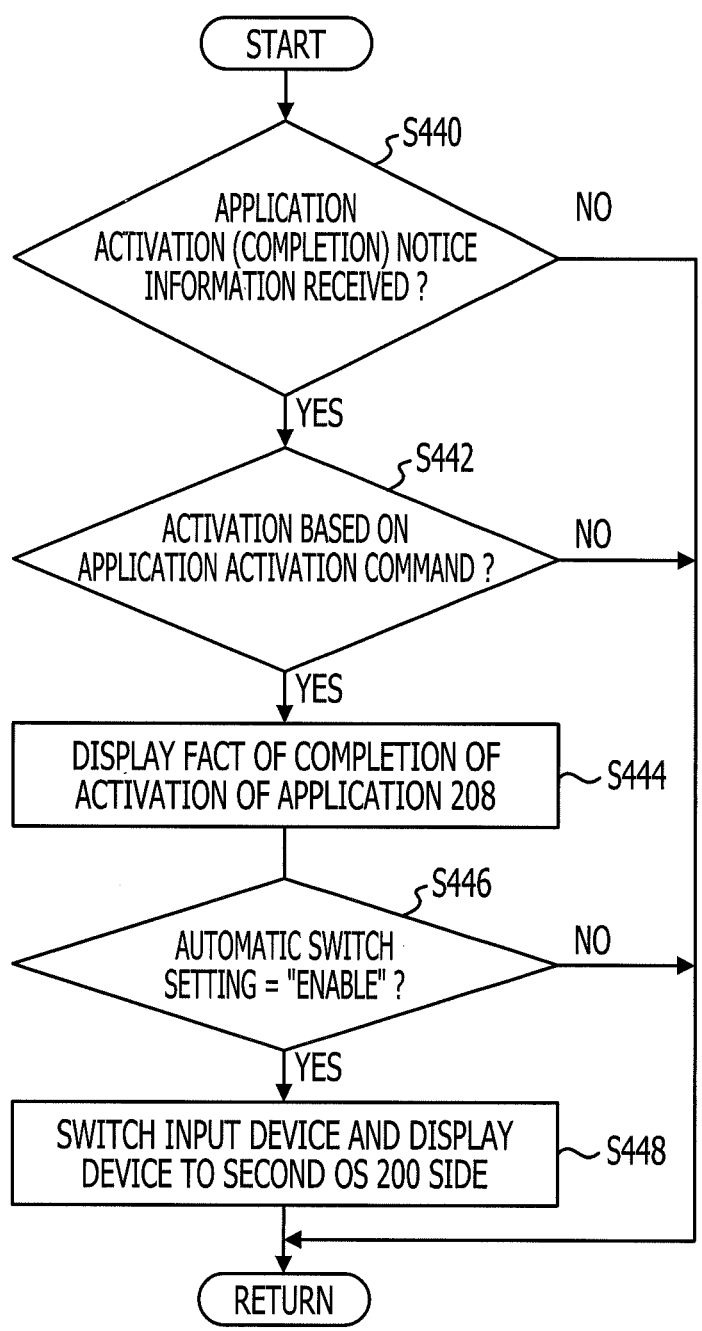
FIG. 8 is a flow chart describing a flow of a process executed by an automatic switch/completion notice control unit according to a first embodiment.

FIGS. 6 to 8 illustrate the processing illustrated in FIG. 5 in a flow chart for each functional block (or functional block group).

FIG. 6 is a flow chart describing a flow of a process executed by the other-OS application activation command creating unit 108. Execution of the flow chart is repeated periodically, for example.

The other-OS application activation command creating unit 108 determines whether the application activation information indicating that the application 112 has been activated is received (S400). The other-OS application activation command creating unit 108 terminates the current routine of the flow chart when the application activation information is not received.

When the application activation information is received, the other-OS application activation command creating unit 108 searches the related-application data table 114 to determine whether or not the application 208 related to the application 112 indicated in the application activation information exists (S402). The other-OS application activation command creating unit 108 terminates the current routine of the flow chart when the application 208 related to the application 112 indicated in the application activation information does not exist in the related-application data table 114. A condition that the application 208 is not activated yet may be added to this determination processing as an AND condition. That is, in S402, the other-OS application activation command creating unit 108 may determine whether the application 208 related to the application 112 indicated in the application activation information exists, and whether the application 208 is not activated yet.

The other-OS application activation command creating unit 108 creates an application activation command for instructing the activation of the application 208 when the application 208 related to the activated application 112 indicated in the application activation information exists (S404). The other-OS application activation command creating unit 108 transmits the created application activation command to the application activation command decoding unit 206 on the second OS 200 side (S406).

FIG. 7 is a flow chart describing a flow of a process executed by the application state monitoring unit 202, the application activation/termination processing unit 204, and the application activation command decoding unit 206. Execution of the flow chart is repeated periodically, for example.

The application activation command decoding unit 206 determines whether an application activation command is received (S420). The current routine of the flow chart is terminated when the application activation command is not received.

The application activation command decoding unit 206 decodes the application activation command when the application activation command is received (S422), and outputs the application activation instruction information to the application activation/termination processing unit 204.

The application activation/termination processing unit 204 activates the application 208 specified by the application activation instruction information (S424). The application activation/termination processing unit 204 outputs application activation (completion) information indicating the completion of the activation to the application state monitoring unit 202 when the activation of the application 208 is completed.

The application state monitoring unit 202 waits until the activation of the application 208 started in S424 is completed (S426). When the activation of the application 208 is completed, the application state monitoring unit 202 transmits the application activation (completion) notice information to the automatic switch/completion notice control unit 106 on the first OS 100 side (S428).

FIG. 8 is a flow chart describing a flow of a process executed by the automatic switch/completion notice control unit 106. Execution of the flow chart is repeated periodically, for example.

The automatic switch/completion notice control unit 106 determines whether or not the application activation (completion) notice information is received (S440). The current routine of the flow chart is terminated when the application activation (completion) notice information is not received.

When the application activation (completion) notice information is received, the automatic switch/completion notice control unit 106 determines whether the activation is based on the application activation command (S442). This determination may be conducted, for example, by determining whether or not the corresponding application activation command has been received from the other-OS application activation command creating unit 108 in a period from a certain time prior to receiving the application activation (completion) notice information to the present time. Alternatively, the determination may also be conducted by referring to information, if any, added to the application activation (completion) notice information to indicate whether or not the activation is based on the application activation command. The current routine of the flow chart is terminated by the automatic switch/completion notice control unit 106 when the activation is not based on the application activation command.

Even when the activation is not based on the application activation command (when activated by some operation by the user), the completion of the activation of the application 208 may be displayed. In this case, the determination in the S442 may be omitted.

When the activation is based on the application activation command, the automatic switch/completion notice control unit 106 instructs the display device 24 to display the fact that the activation of the application 208 is completed (S444).

The automatic switch/completion notice control unit 106 determines whether or not the automatic switch setting information received beforehand from the input/output automatic switch setting unit 110 is set as "enable" (S446). The current routine of the flow chart is terminated by the automatic switch/completion notice control unit 106 when the automatic switch setting information is not set as "enable."

When the automatic switch setting information is set as "enable," the automatic switch/completion notice control unit 106 instructs the input/output switching unit 26 to output the input/output switching signal that instructs the input device 22 and the display device 24 to be associated with the second OS 200 side (S448). That is, the input device 22 and the display device 24 are switched to the second OS 200 side.

The above description mainly describes the switching of the applications and OSs from the first OS 100 side to the second OS 200 side. Since the expected power consumption of the second OS 200 is larger than that of the first OS 100, the power consumption of the information processing apparatus 1 may be controlled, for example, by activating the first OS 100 in an initial state and activating the second OS 200 as desired. Without being limited to the above, the information processing apparatus 1 may conduct the switching of the applications and OSs from the second OS 200 side to the first OS 100 side in a similar way.

The information processing apparatus according to the present embodiment described above may improve convenience for the user.

Moreover, the power consumption of the information processing apparatus may be controlled, for example, by activating the first OS 100 with low power consumption in an initial state and activating the second OS 200 with high power consumption as desired.

Second Embodiment

An information processing apparatus according to a second embodiment will be discussed below with reference to the drawings.

Hardware and Functional Configuration

The hardware configuration is fundamentally the same as that in the first embodiment, therefore FIG. 2 is referred to and the graphical representation and a discussion thereof will be omitted. Hereinafter, constituent elements in common with those of the first embodiment will be indicated with the same reference numeral and discussions of the basic functions thereof will be omitted.

Figure 9:
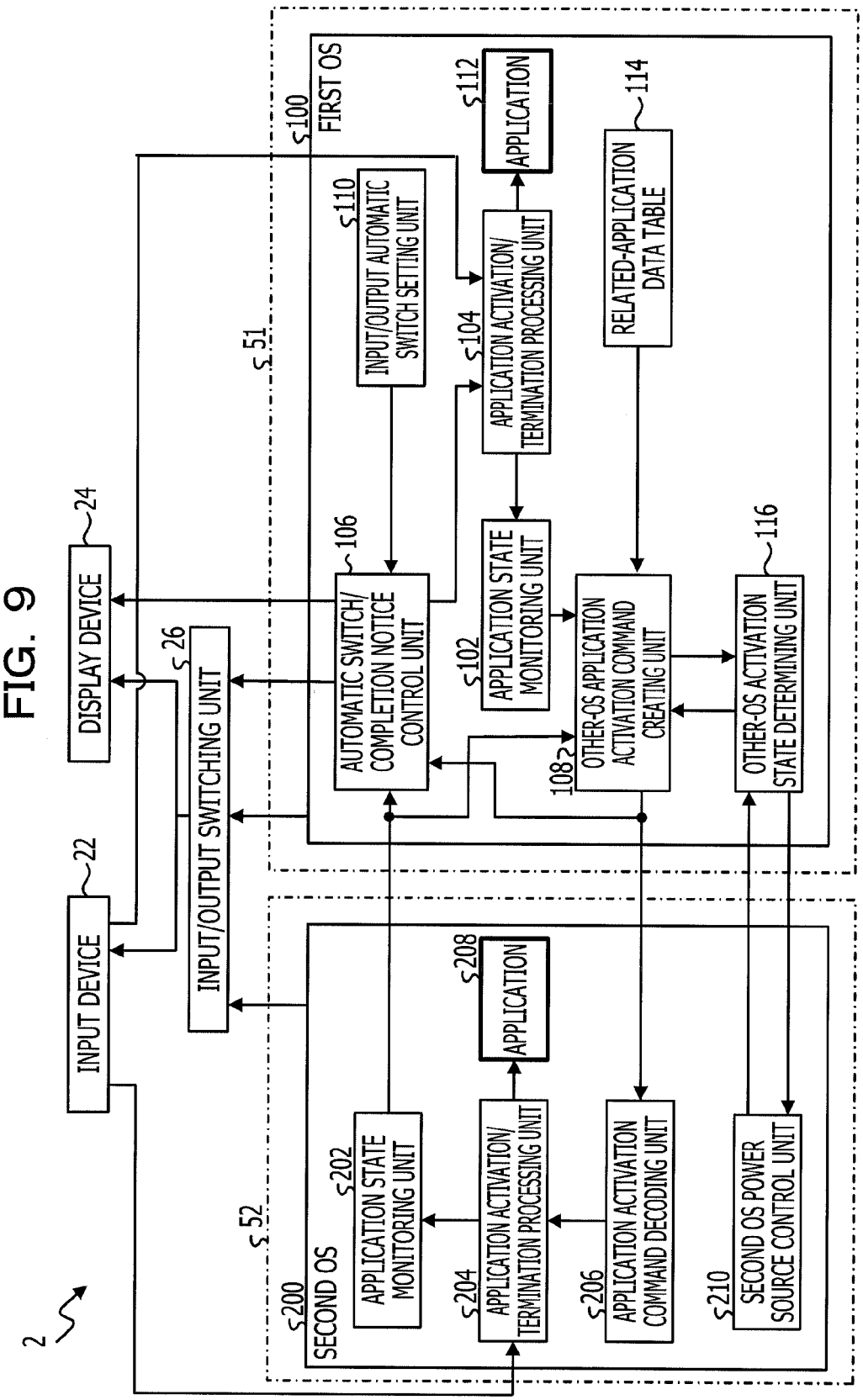
FIG. 9 is an example of a functional configuration of an information processing apparatus according to a second embodiment.

FIG. 9 is an example of a functional configuration of an information processing apparatus 2 according to the second embodiment. The information processing apparatus 2 may run the first OS 100 and the second OS 200 using separate platforms 51 and 52, respectively. The first platform 51 is, for example, a platform based on ARM (trademark) architecture. The second platform 52 is, for example, a platform based on Intel (trademark) architecture. The second platform may have a higher maximum processing capacity per unit of time than the first platform. The first platform may consume less power than the second platform when running the same processes. Each platform has a dedicated CPU 10. At least portions of, for example, the drive device 12, the auxiliary storage device 16, the memory device 18, and the interface 20 may be included in the respective platforms. A multi-core processor, for example, in which a plurality of CPUs 10 form respective platforms, is desirably used.

The relationships among the input device 22, the display device 24, and the input/output switching unit 26 are similar to those in the first embodiment.

The first OS 100 and the second OS 200 of the second embodiment fundamentally operate by the selection of one or the other, but are also able to operate concurrently by using the respective platforms. The display device 24 selectively displays a display screen of one of the OSs even during a period in which the first OS 100 and the second OS 200 operate concurrently.

The application state monitoring unit 102, the application activation/termination processing unit 104, the automatic switch/completion notice control unit 106, the other-OS application activation command creating unit 108, the input/output automatic switch setting unit 110, the application 112, and an other-OS activation state determining unit 116 and the like run on the first OS 100. A first OS power source control unit (not illustrated) may be present, or a below-mentioned second OS power source control unit 210 may control (shared by the first OS 100 and the second OS 200) a power supply supplied to the first platform 51. The other-OS application activation command creating unit 108 may refer to the related-application data table 114 stored in the auxiliary storage device 16, the memory device 18, and the like. The first OS 100 is, for example, an Android OS.

The other-OS application activation command creating unit 108 searches the related-application data table 114 for the application 208 related to the activated application 112 by using the application activation/termination information received from the application state monitoring unit 102. The other-OS application activation command creating unit 108 refers to the application activation/termination notice information. When the application 208 related to the activated application 112 has not been activated, the other-OS application activation command creating unit 108 refers to other-OS activation state information received from the other-OS activation state determining unit 116 to conduct the processing described below.

When the second OS 200 has not been activated, the other-OS application activation command creating unit 108 outputs other-OS activation request information to the other-OS activation state determining unit 116. The second OS 200 then transmits an other-OS application activation command to the application activation command decoding unit 206. The second OS 200 also outputs the other-OS application activation command to the automatic switch/completion notice control unit 106. When the second OS 200 has been activated, the other-OS application activation command creating unit 108 transmits the other-OS application activation command to the application activation command decoding unit 206 and outputs the other-OS application activation command to the automatic switch/completion notice control unit 106.

The other-OS activation state determining unit 116 receives second OS activation/termination notice information from the second OS power source control unit 210 and outputs the other-OS activation state information based on the second OS activation/termination notice information to the other-OS application activation command creating unit 108. Upon receiving the other-OS activation request information from the other-OS application activation command creating unit 108, the other-OS activation state determining unit 116 outputs a second OS activation command to the second OS power source control unit 210.

The application state monitoring unit 202, the application activation/termination processing unit 204, the application activation command decoding unit 206, the application 208, and the like run on the second OS 200. The second OS 200 is, for example, a Windows OS.

The information processing apparatus 2 according to the second embodiment includes the second OS power source control unit 210 as a constituent element of the second OS 200 side. The second OS power source control unit 210 controls the power supply supplied to the second platform 52. The second OS power source control unit 210 transmits the second OS activation/termination information that indicates the activation or termination state of the second OS 200 to the other-OS activation state determining unit 116 on the first OS 100 side.

The application 112, the application 208, and the related-application data table 114 are similar to those in the first embodiment. The functions of the constituent elements other than the second OS power source control unit 210, the other-OS application activation command creating unit 108, and the other-OS activation state determining unit 116 are similar to the functions in the first embodiment. Thus discussion thereof will be omitted.

In the second embodiment, the expected power consumption of the second OS 200 is similarly assumed to be larger than that of the first OS 100. Since the platforms of the first OS 100 and the second OS 200 are different in the second embodiment as described above, the CPU frequency and the supply voltage and the like may be different in the second embodiment, and the difference of the expected power consumption may be larger than that of the first embodiment. As a result, the effect of being able to control the power consumption by activating the first OS 100 in the initial state and activating the second OS 200 as desired may be greater than in the first embodiment.

Processing for Automatically Activating Application of Other OS

Processing (other-OS application automatic activation processing) conducted by the information processing apparatus 2 according to the present embodiment to automatically activate an application of another OS will be discussed below with reference to a sequence diagram and flow charts.

Figure 10:
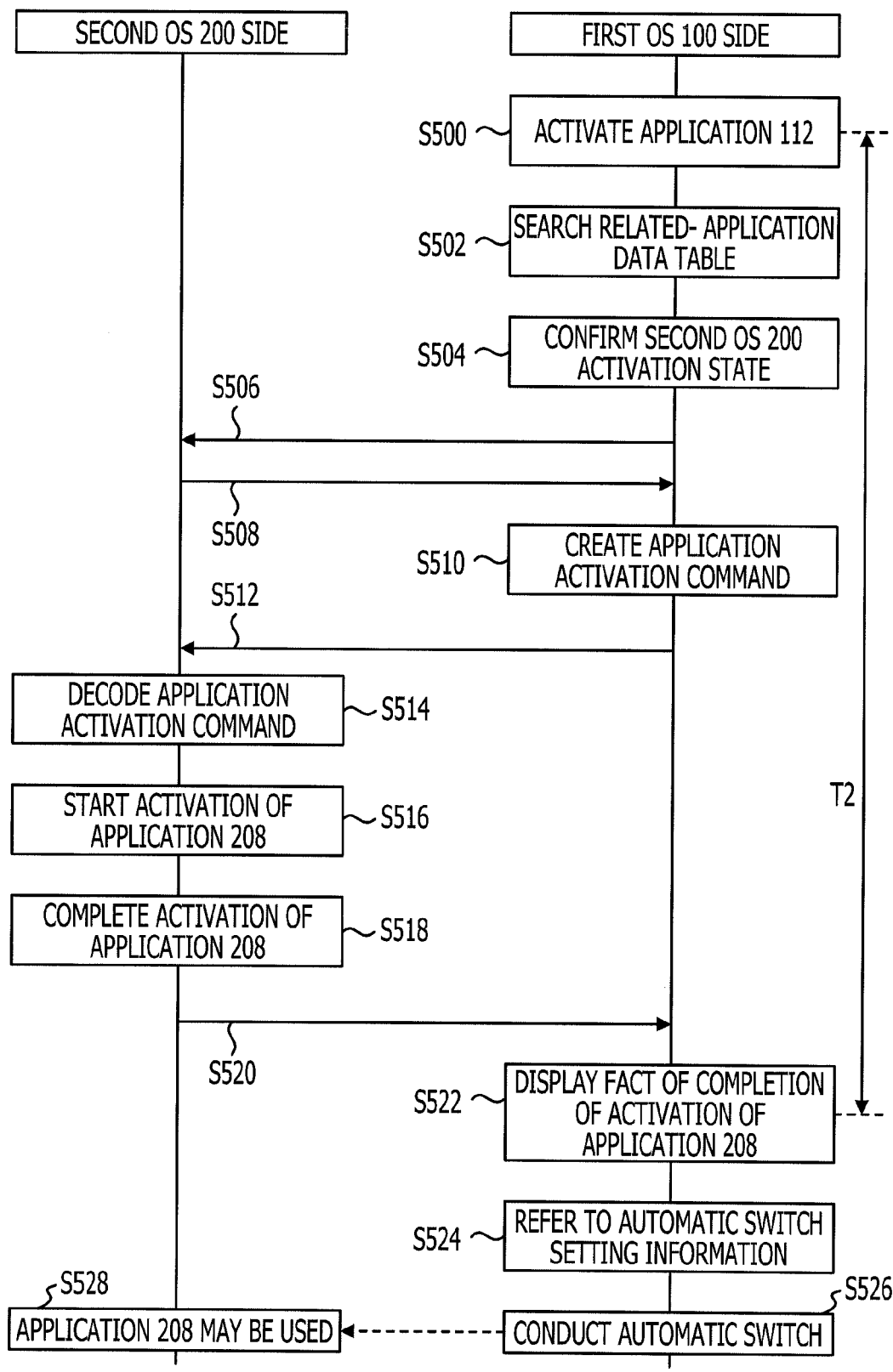
FIG. 10 is a sequence diagram of a flow of a process executed by an information processing apparatus according to a second embodiment.

FIG. 10 is a sequence diagram of a flow of a process executed by the information processing apparatus 2. Determination processing and the like will be discussed in detail with reference to the flow charts and an outline of the processing will be discussed with reference to the sequence diagram.

First, the application 112 is activated on the first OS 100 (S500). When the application 112 is activated, application activation information is inputted from the application state monitoring unit 102 to the other-OS application activation command creating unit 108. The other-OS application activation command creating unit 108 searches the related-application data table 114 upon receiving the application activation information (S502).

The other-OS application activation command creating unit 108 confirms the activation state of the second OS 200 on the basis of the other-OS activation state information when the application 208 related to the activated application 112 exists in the related-application data table 114 (S504).

When the second OS 200 has not been activated, the other-OS application activation command creating unit 108 instructs the other-OS activation state determining unit 116 to transmit a second OS activation command to the second OS power source control unit 210 (S506).

When the supply of power to the second platform 52 and the activation of the second OS 200 are completed, the second OS power source control unit 210 transmits second OS activation (completion) notice information to the other-OS activation state determining unit 116 (S508).

Upon receiving the second OS activation (completion) notice information, the other-OS activation state determining unit 116 outputs other-OS activation state information (activation completion) to the other-OS application activation command creating unit 108. Upon receiving the other-OS activation state information (activation completion), the other-OS application activation command creating unit 108 creates an application activation command (S510) and transmits the created application activation command to the application activation command decoding unit 206 (S512). The application activation command is also outputted to the automatic switch/completion notice control unit 106.

Similar to the first embodiment, the application activation command decoding unit 206 decodes the application activation command (S514). The application activation command decoding unit 206 outputs the application activation instruction information specifying the application 208 to be activated to the application activation/termination processing unit 204. The application activation/termination processing unit 204 starts the activation of the specified application 208 upon receiving the application activation instruction information (S516). When the activation of the application 208 is completed (S518), the application state monitoring unit 202 transmits the application activation (completion) notice information to the automatic switch/completion notice control unit 106 on the first OS 100 side (S520). Upon receiving the application activation (completion) notice information, the automatic switch/completion notice control unit 106 instructs the display device 24 to display the fact that the activation of the application 208 is completed when the activation is based on the application activation command (S522).

During this time period T2 from when the application 112 is activated in S500 until the fact that the activation of the application 208 is completed is displayed in S522, the display screen by the first OS 100 is displayed by the display device 24 and the user may continue using the application 112. That is, the automatic activation processing of the application 208 related to the application 112 is conducted in the background as seen from the user's point of view. As a result, the user is not expected to wait until the OS and application switching processing is completed, which is an improvement in convenience for the user.

The automatic switch/completion notice control unit 106 refers to the automatic switch setting information received beforehand from the input/output automatic switch setting unit 110 (S524). When the automatic switch setting information is set as "enable," the automatic switch/completion notice control unit 106 instructs the input/output switching unit 26 to output an input/output switching signal that instructs the input device 22 and the display device 24 to be associated with the second OS 200 side (S526). At this time, the automatic switch/completion notice control unit 106 may instruct the application activation/termination processing unit 104 to terminate the application 112.

By the processing the S526, the user may use the application 208 since the display screen displayed by the display device 24 is switched to the display screen of the second OS 200 and the contents inputted to the input device 22 are reflected in the second OS 200 (S528).

Conversely, when the automatic switch setting information is set as "disable," the automatic switch/completion notice control unit 106 does not perform the processing in S526 and terminates the other-OS application automatic activation processing. In this case, the user may activate the second OS 200 to use the application 208 by performing an OS switching operation on the input device 22.

Thus, the expectation for the user to manually reactivate the OS for switching between OSs or press a button for instructing a switch may be omitted according to the user's desire (automatic switch setting). The time and effort involved to search for a desired application and activate the desired application on the selected OS may also be omitted. Therefore, the information processing apparatus 2 that executes the above processing may improve the convenience for the user.

FIGS. 11 to 15 illustrate the processing illustrated in FIG. 10 in a flow chart for each functional block (or functional block group).

Figure 11:
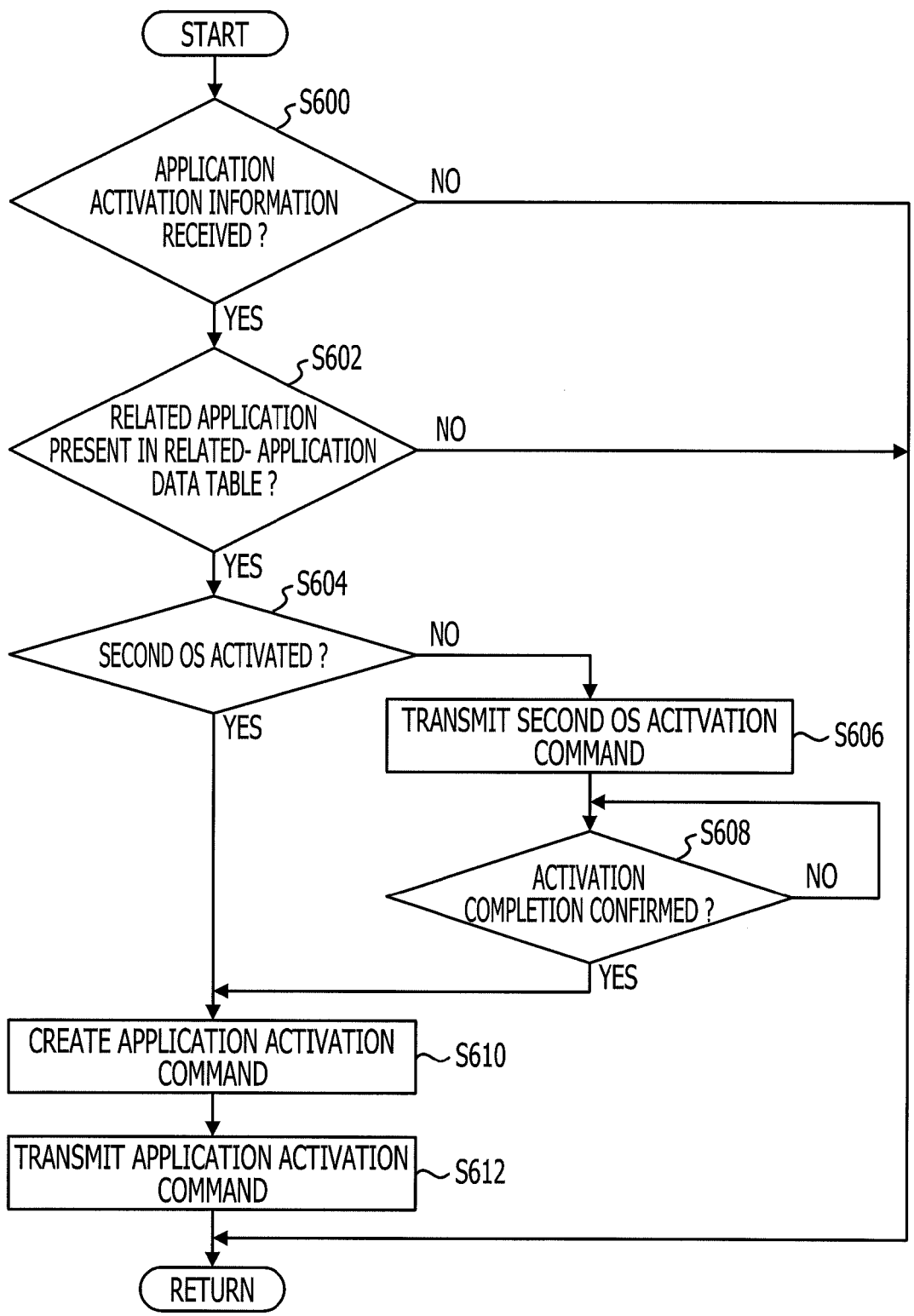
FIG. 11 is a flow chart describing a flow of a process executed by an other-OS application activation command creating unit according to a second embodiment.

FIG. 11 is a flow chart describing a flow of a process executed by the other-OS application activation command creating unit 108. Execution of the flow chart is repeated periodically, for example.

The other-OS application activation command creating unit 108 determines whether the application activation information indicating that the application 112 has been activated is received (S600). The other-OS application activation command creating unit 108 terminates the current routine of the flow chart when the application activation information is not received.

When the application activation information is received, the other-OS application activation command creating unit 108 searches the related-application data table 114 to determine whether or not the application 208 related to the application 112 indicated in the application activation information exists (S602). The other-OS application activation command creating unit 108 terminates the current routine of the flow chart when the application 208 related to the application 112 indicated in the application activation information does not exist in the related-application data table 114. A condition that the application 208 is not activated yet may be added to this determination processing as an AND condition. That is, in S602, the other-OS application activation command creating unit 108 may determine whether the application 208 related to the application 112 indicated in the application activation information exists, and whether the application 208 is not activated yet.

When the application 208 related to the activated application 112 exists, the other-OS application activation command creating unit 108 refers to the other-OS activation state information received from the other-OS activation state determining unit 116 to determine whether or not the second OS 200 has been activated (S604).

When the second OS 200 has not been activated, the other-OS application activation command creating unit 108 outputs other-OS activation request information to the other-OS activation state determining unit 116. Upon receiving the other-OS activation request information, the other-OS activation state determining unit 116 transmits the second OS activation command to the second OS power source control unit 210 on the second OS 200 side (S606). The other-OS application activation command creating unit 108 waits until the activation completion of the second OS 200 is confirmed based on the other-OS activation state information (activation completion) received from the other-OS activation state determining unit 116 (S608).

The other-OS application activation command creating unit 108 creates an application activation command for instructing the activation of the application 208 (S610), and transmits the created application activation command to the application activation command decoding unit 206 on the second OS 200 side (S612).

Figure 12:
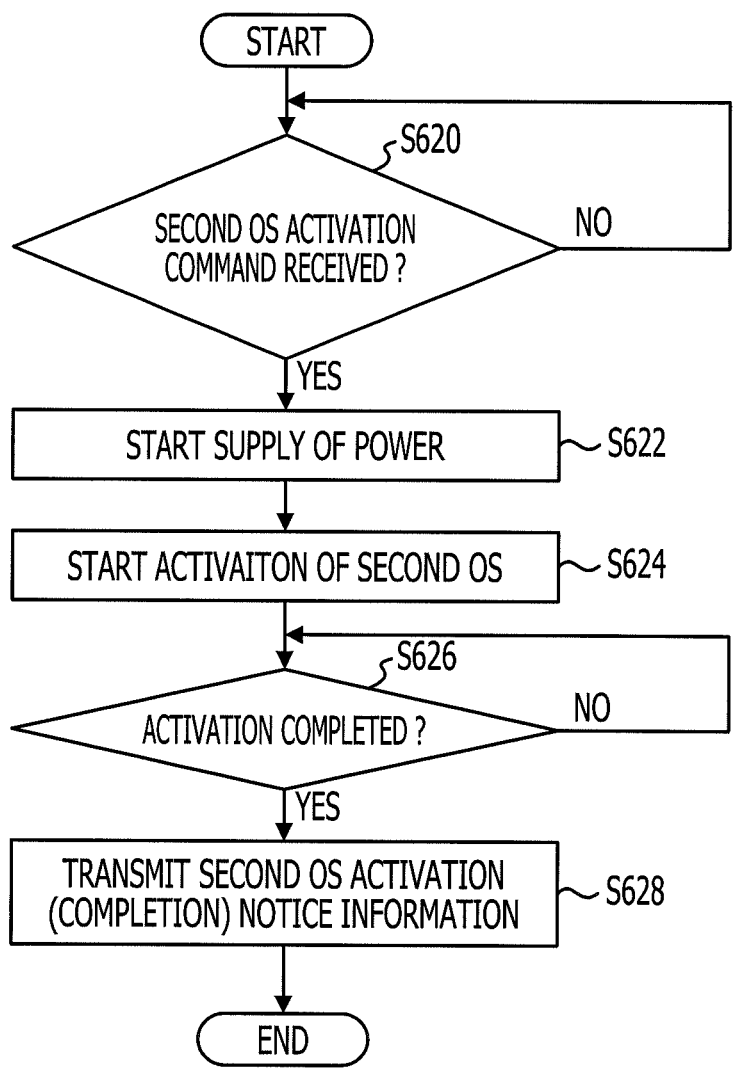
FIG. 12 is a flow chart describing a flow of a second OS activation process executed by a second OS power control unit according to a second embodiment.

FIG. 12 is a flow chart describing a flow of the second OS activation process executed by the second OS power source control unit 210. This process is started when the second OS 200 is in a state of shut down.

The second OS power source control unit 210 waits until the second OS activation command is received from the other-OS activation state determining unit 116 (S620).

Upon receiving the second OS activation command from the other-OS activation state determining unit 116, the second OS power source control unit 210 starts the supply of power to the second platform 52 (S622). The processing in S620 and S622 may be conducted using a sleep mode power source and the like.

The second OS power source control unit 210 then starts the activation of the second OS 200 (S624), and waits until the activation of the second OS 200 is completed (S626). When the activation of the second OS 200 is completed, the second OS power source control unit 210 transmits the second OS activation (completion) notice information to the other-OS activation state determining unit 116 (S628).

Figure 13:
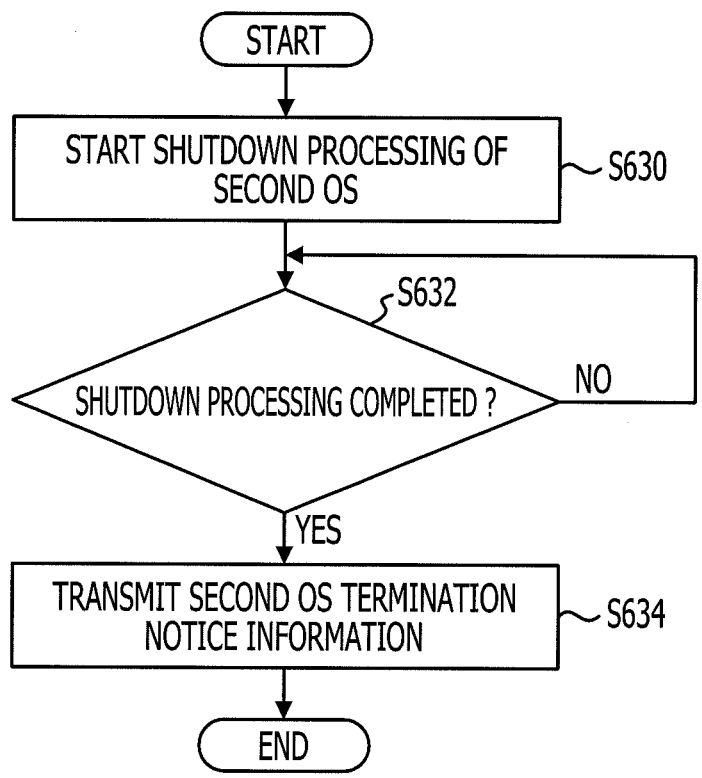
FIG. 13 is a flow chart describing a flow of a second OS termination process executed by a second OS power control unit according to a second embodiment.

FIG. 13 is a flow chart describing a flow of the second OS termination process executed by the second OS power source control unit 210. This process is started when the shutdown of the second OS 200 is instructed through a user operation and the like while the second OS 200 is in an activated state.

The second OS power source control unit 210 starts the shutdown processing of the second OS 200 (S630) and waits until the shutdown processing of the second OS 200 is completed (S632). When the shutdown processing of the second OS 200 is completed, the second OS power source control unit 210 transmits second OS termination notice information to the other-OS activation state determining unit 116 (S634).

Figure 14:
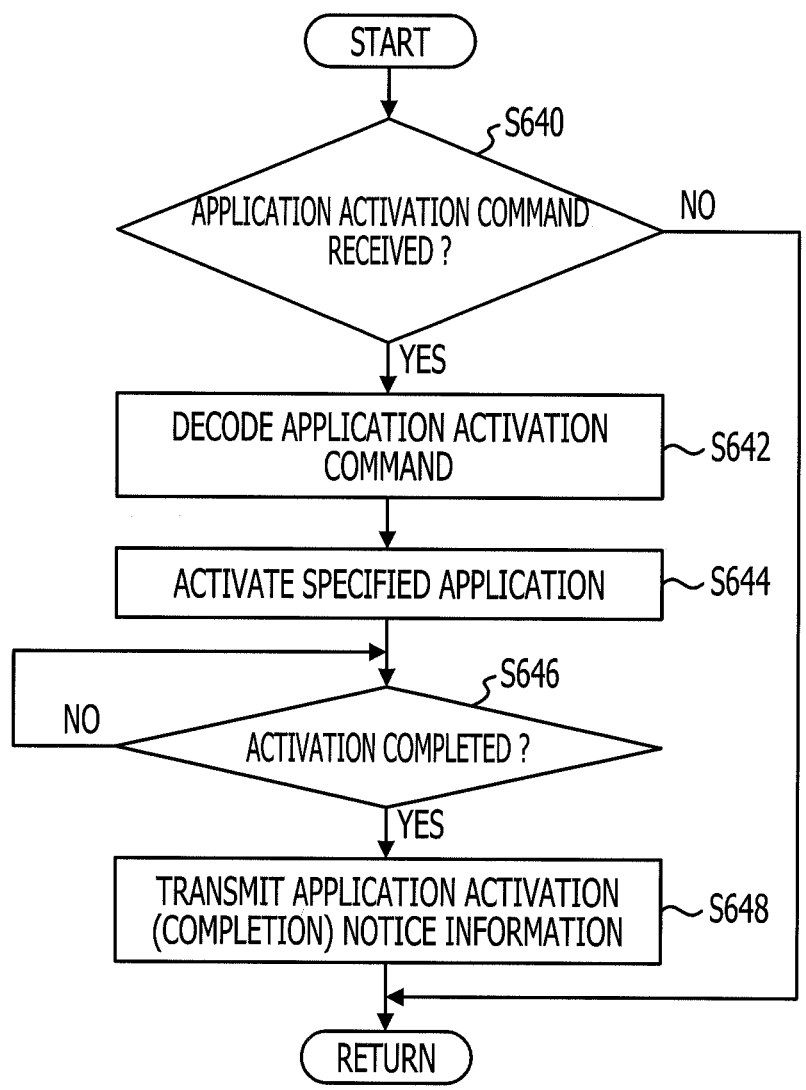
FIG. 14 is a flow chart describing a flow of a process executed by an application state monitoring unit, an application activation/termination processing unit, and an application activation command decoding unit according to a second embodiment.

FIG. 14 is a flow chart describing a flow of a process executed by the application state monitoring unit 202, the application activation/termination processing unit 204, and the application activation command decoding unit 206. Execution of the flow chart is repeated periodically, for example.

The application activation command decoding unit 206 determines whether the application activation command is received (S640). The current routine of the flow chart is terminated when the application activation command is not received.

The application activation command decoding unit 206 decodes the application activation command when the application activation command is received (S642), and outputs the application activation instruction information to the application activation/termination processing unit 204.

The application activation/termination processing unit 204 activates the application 208 specified by the application activation instruction information (S644).

The application state monitoring unit 202 waits until the activation of the application 208 started in S644 is completed (S646). When the activation of the application 208 is completed, the application state monitoring unit 202 transmits the application activation (completion) notice information to the automatic switch/completion notice control unit 106 on the first OS 100 side (S648).

FIG. 15 is a flow chart describing a flow of a process executed by the automatic switch/completion notice control unit 106. Execution of the flow chart is repeated periodically, for example.

The automatic switch/completion notice control unit 106 determines whether or not the application activation (completion) notice information is received (S660). The current routine of the flow chart is terminated when the application activation (completion) notice information is not received.

When the application activation (completion) notice information is received, the automatic switch/completion notice control unit 106 determines whether the activation is based on the application activation command (S662). This determination may be conducted, for example, by determining whether or not the corresponding application activation command has been received from the other-OS application activation command creating unit 108 in a period from a certain time prior to receiving the application activation (completion) notice information to the present time. Alternatively, the determination may also be conducted by referring to information, if any, added to the application activation (completion) notice information to indicate whether or not the activation is based on the application activation command. The current routine of the flow chart is terminated by the automatic switch/completion notice control unit 106 when the activation is not based on the application activation command.

Even when the activation is not based on the application activation command (when activated by some operation by the user), the completion of the activation of the application 208 may be displayed. In this case, the determination in the S662 may be omitted.

When the activation is based on the application activation command, the automatic switch/completion notice control unit 106 instructs the display device 24 to display the fact that the activation of the application 208 is completed (S664).

The automatic switch/completion notice control unit 106 determines whether or not the automatic switch setting information received beforehand from the input/output automatic switch setting unit 110 is set as "enable" (S666). The current routine of the flow chart is terminated by the automatic switch/completion notice control unit 106 when the automatic switch setting information, is not set as "enable."

When the automatic switch setting information is set as "enable", the automatic switch/completion notice control unit 106 instructs the input/output switching unit 26 to output the input/output switching signal that instructs the input device 22 and the display device 24 to be associated with the second OS 200 side (S668). That is, the input device 22 and the display device 24 are switched to the second OS 200 side.

The information processing apparatus according to the present embodiment as described above may improve convenience for the user.

Moreover, the power consumption of the information processing apparatus may be controlled, for example, by activating the first OS 100 with low power consumption in an initial state and activating the second OS 200 with high power consumption as desired.

While the embodiments have been described above, embodiments are not limited to the above-described embodiments and various improvements and modifications are possible without departing from the spirit of the disclosure.

For example, in the embodiments described above, the input device 22 and the display device 24 are switched to the second OS 200 side after the display device 24 is instructed to display the completion of the application 208 activated in the background. However, the display may be omitted and only the switching may be conducted.

In the embodiments described above, the functional blocks periodically confirm whether or not the various types of information have been received. However, the various types of information may be notified by interruption and the processing may be started automatically when the information is received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
    a user interface for a user that operates a first processing unit that runs a first operating system or a second processing unit that runs a second operating system;
    a switching unit that selectively switches between the first processing unit and the second processing unit to be associated with the user interface; and
    a computer to
        function as the first processing unit,
        function as the second processing unit,
        run a first application program on the first operating system,
        activate, on the second operating system, a second application program related to the first application program, in a state in which the first processing unit is associated with the user interface, and
        control the switching unit upon completion of the activation of the second application program.

2. The information processing apparatus according to claim 1, further comprising:
    a memory device that stores a data table in which the first application program is associated with the second application program,
    wherein the computer extracts the second application program from the data table by using the first application program to activate the second application program.

3. The information processing apparatus according to claim 1, further comprising:
    an input device that receives a switching instruction to the switching unit from the user; and
    a memory device that holds a flag to determine whether an automatic switching instruction to the switching unit is enabled or disabled, the automatic switching instruction being an instruction for automatically switching between the operating systems,
    wherein the computer controls the switching unit such that
        the switching unit switches to the second processing unit upon the completion of the activation of the second application program when the flag indicates that the automatic switching instruction is enabled, and
        the switching unit switches to the second processing unit in response to the switching instruction received by the input device when the flag indicates that the automatic switching instruction is disabled.

4. The information processing apparatus according to claim 1, further comprising:
    an input device that receives a switching instruction to the switching unit from the user,
    wherein the computer outputs to the user interface, by executing the first operating system, a message prompting the user to operate the input device to switch between the operating systems.

5. The information processing apparatus according to claim 1, wherein
    expected power consumption for running the first operating system is smaller than expected power consumption for running the second operating system.

6. The information processing apparatus according to claim 1, wherein
    the computer includes a first processor and a second processor different from the first processor,
    the first processing unit is the first processor,
    the second processing unit is the second processor, and
    the computer activates the second operating system before activating the second application program.

7. A method for controlling an information processing apparatus, wherein
    the information processing apparatus includes
        a user interface for a user that operates a first processing unit that runs a first operating system or a second processing unit that runs a second operating system,
        a switching unit that selectively switches between the first processing unit and the second processing unit to be associated with the user interface, and
        a computer that functions as the first processing unit and as the second processing unit,
    the method comprising:
        running a first application program on the first operating system;
        activating, on the second operating system, a second application program related to the first application program, in a state in which the first processing unit is associated with the user interface; and
        controlling, by the computer, the switching unit upon completion of the activation of the second application program.

8. A non-transitory computer-readable recording medium storing a program that causes a computer to execute a procedure, wherein
    the computer is included in an information processing apparatus,
    the information processing apparatus includes
        a user interface for a user that operates a first processing unit that runs a first operating system or a second processing unit that runs a second operating system, and a switching unit that selectively switches between the first processing unit and the second processing unit to be associated with the user interface, and the computer functions as the first processing unit and as the second processing unit, the procedure comprising:
  running a first application program on the first operating system;
  activating, on the second operating system, a second application program related to the first application program, in a state in which the first processing unit is associated with the user interface; and
  controlling the switching unit upon completion of the activation of the second application program.

* * * * *